(12) United States Patent
Keitsch et al.

(10) Patent No.: US 12,394,805 B2
(45) Date of Patent: Aug. 19, 2025

(54) BIPOLAR PLATE AND FUEL CELL STACK

(71) Applicant: AUDI AG, Ingolstadt (DE)

(72) Inventors: Oliver Keitsch, Heilbronn (DE); Armin Siebel, Neckarsulm (DE); Sebastian Voigt, Heilbronn (DE)

(73) Assignee: AUDI AG, Ingolstadt (DE)

( * ) Notice: Subject to any disclaimer, the term of this patent is extended or adjusted under 35 U.S.C. 154(b) by 384 days.

(21) Appl. No.: 18/004,003

(22) PCT Filed: Oct. 25, 2021

(86) PCT No.: PCT/EP2021/079471
§ 371 (c)(1),
(2) Date: Dec. 30, 2022

(87) PCT Pub. No.: WO2022/090125
PCT Pub. Date: May 5, 2022

(65) Prior Publication Data
US 2023/0261213 A1 Aug. 17, 2023

(30) Foreign Application Priority Data
Oct. 28, 2020 (DE) ...................... 10 2020 128 279.6

(51) Int. Cl.
H01M 8/026 (2016.01)
H01M 8/10 (2016.01)

(52) U.S. Cl.
CPC .... *H01M 8/026* (2013.01); *H01M 2008/1095* (2013.01)

(58) Field of Classification Search
CPC ...................... H01M 8/026; H01M 2008/1095
See application file for complete search history.

(56) References Cited

U.S. PATENT DOCUMENTS

2012/0321987 A1 12/2012 Goto et al.

FOREIGN PATENT DOCUMENTS

| | | |
|---|---|---|
| CN | 108736037 A | 11/2018 |
| CN | 111029611 A | 4/2020 |
| CN | 111211336 A | 5/2020 |
| DE | 102008033211 A1 | 1/2010 |
| DE | 102016111638 A1 | 12/2017 |
| DE | 102019200084 A1 | 7/2019 |
| DE | 102020101948 A1 | 8/2020 |
| EP | 2026393 A1 | 2/2009 |
| JP | 2000294261 A | 10/2000 |
| WO | WO 2013105956 A1 | 7/2013 |

OTHER PUBLICATIONS

International Preliminary Report on Patentability, dated Aug. 25, 2022, for International Patent Application No. PCT/EP2021/079471. (5 pages).

International Search Report, mailed Feb. 22, 2022, for International Patent Application No. PCT/EP2021/079471. (3 pages).

*Primary Examiner* — Sarah A. Slifka
(74) *Attorney, Agent, or Firm* — Seed Intellectual Property Law Group LLP

(57) ABSTRACT

A bipolar plate formed with a reactant flow field on each of its plate surfaces facing away from each other, comprises multiple flow ducts for a reaction medium, bounded by walls of webs, wherein the respective reactant flow field is connected fluidically to a media port across a distribution region situated outside an active region, wherein at least one duct of the distribution field is provided with a flow divider to divide up a flowing reaction medium before it is introduced into the active region. The duct comprising the flow divider has a duct elevation, comprising an ascent, which is present at a given distance upstream from the flow divider. A fuel cell stack having a plurality of such bipolar plates is also provided.

10 Claims, 5 Drawing Sheets

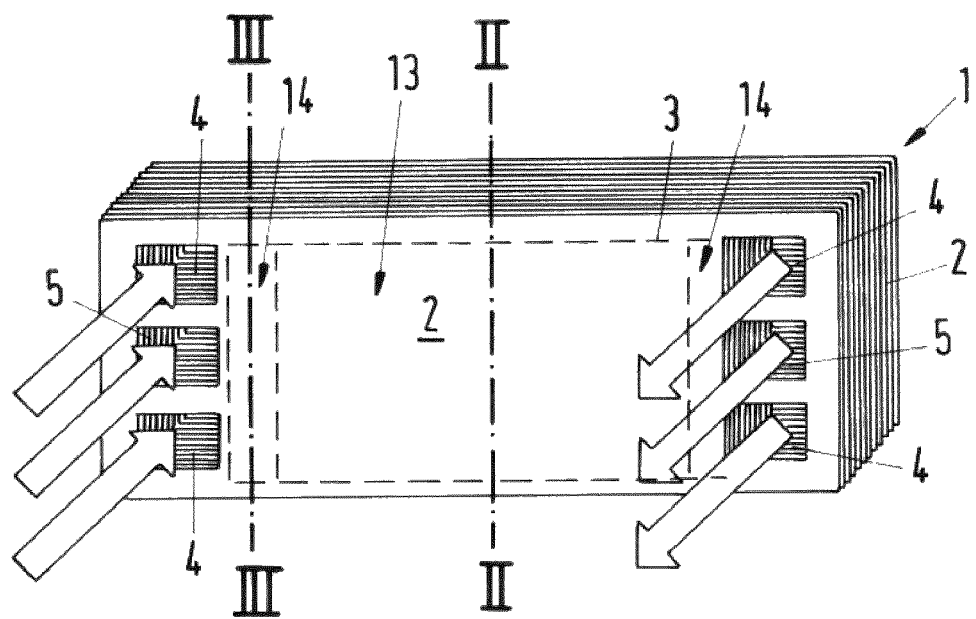
Fig.1
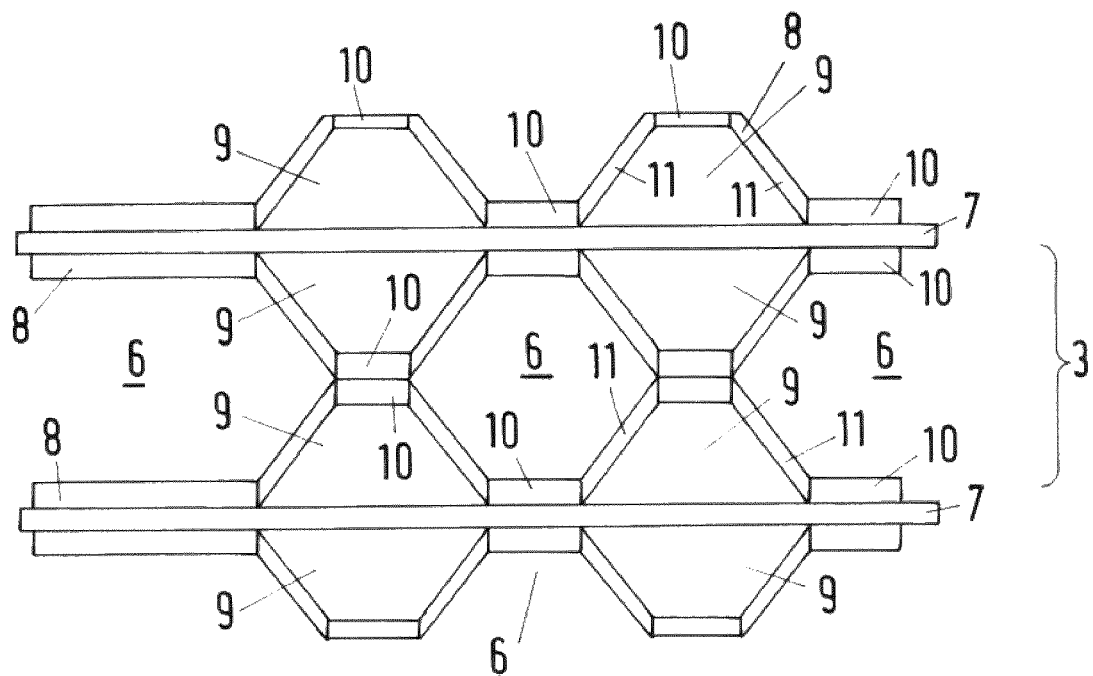
Fig.2 II-II

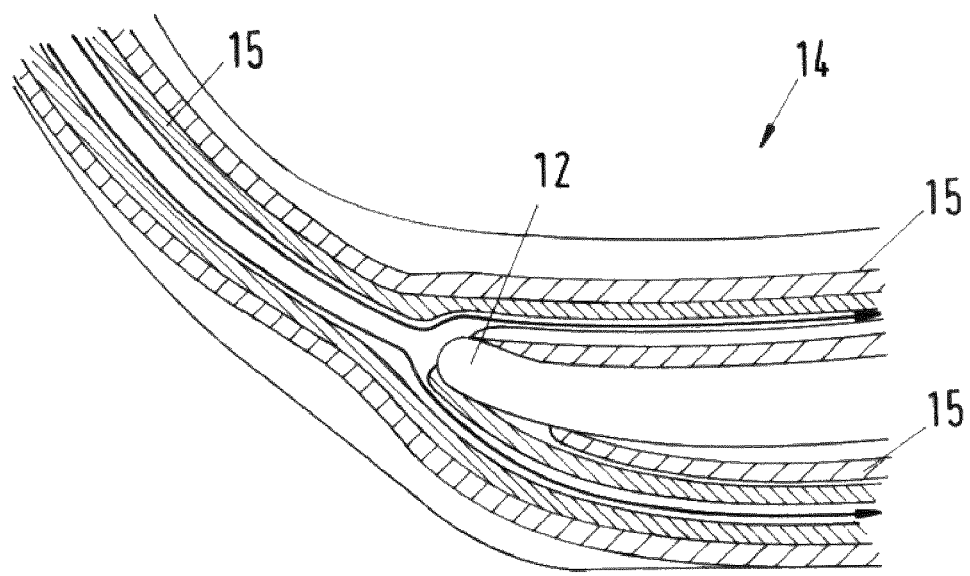
Fig. 3 (Stand der Technik)
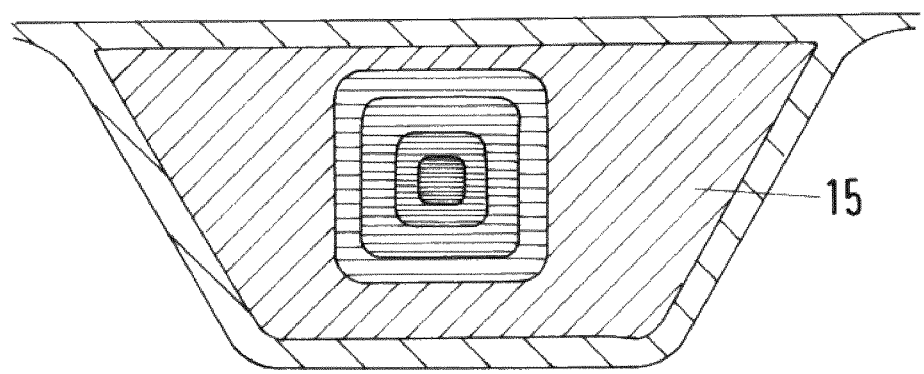
Fig. 4 (Stand der Technik)

BIPOLAR PLATE AND FUEL CELL STACK

BACKGROUND

Technical Field

Embodiments of the invention relate to a bipolar plate formed with a reactant flow field on each of its plate surfaces facing away from each other. Embodiments of the invention furthermore relate to a fuel cell stack having a plurality of fuel cells which are associated with such bipolar plates.

Description of the Related Art

Fuel cell devices are used for the chemical transformation of a fuel with oxygen to form water in order to create electric energy. For this, fuel cells contain as their key component the so-called membrane electrode assembly (MEA), which is an assemblage of a proton-conducting membrane and an electrode arranged on either side of the membrane (anode and cathode). Furthermore, gas diffusion layers (GDL) may be arranged on either side of the membrane electrode unit at the sides of the electrodes facing away from the membrane. In operation of the fuel cell device having a plurality of fuel cells assembled into a fuel cell stack, the fuel, especially hydrogen $H_2$ or a gas mixture containing hydrogen, is supplied to the anode, where an electrochemical oxidation of $H_2$ to $H^+$ takes place, giving off electrons. Through the electrolyte or the membrane which separates the reaction spaces from each other and electrically insulates them, a transport of the protons $H^+$ from the anode space to the cathode space occurs. The electrons provided at the anode are taken by an electrical line to the cathode. The cathode is supplied with oxygen or a gas mixture containing oxygen, so that a reduction of $O_2$ to $O^{2-}$ occurs, taking up electrons. At the same time, these oxygen anions react in the cathode space with the protons transported across the membrane to form water.

The reactant gases are supplied to the electrodes of the fuel cells by means of bipolar plates. In addition to the reactant gases, a cooling medium is also taken through the bipolar plates on account of the heat generated during the fuel cell reaction, so that three different media are taken through the bipolar plates in the smallest of spaces.

When supplying the fuel cells with the reactants, these are taken by main ducts (ports) to the bipolar plates, which is supposed to bring about a distribution of the reactants in an active region, in order to supply the entire surface of the electrodes as evenly as possible by means of a flow field. Since multiple bipolar plates are stacked with the membrane electrode units in the fuel cell stack, seals are used in order to seal off the main ducts along the fuel cell stack. In addition, a good sealing effect against the cooling medium flowing in coolant ducts must occur.

In order to produce an equal distribution of the reaction medium over the active region of the bipolar plate, DE 10 2008 033 211 A1 and EP 2 026 393 A1 propose a targeted varying of the flow cross section of the flow ducts of the reactant flow field along their lengthwise extension, in order to equalize the pressure losses. A bipolar plate in which the active region is divided into an entry region and a remaining partial region will be found in DE 10 2016 111 638 A1, where the flow channels of the two partial regions are formed with different flow cross sections.

Outside of the active region, especially in the region where the active region is supplied from the media ports, it is customary to distribute the operating media evenly by the specific use of branching points of the flow channel. In this distribution region, when an individual duct is divided into two, three or four ducts of the following region, especially given high volume flows and/or flow velocities, it is increasingly more difficult to achieve a uniform division of the overall volume flow. Therefore, the distribution field may result in an unequal distribution of the reaction medium for the active region of the bipolar plate.

BRIEF SUMMARY

Some embodiments relate to a bipolar plate formed with a reactant flow field on each of its plate surfaces facing away from each other. Each of the reactant flow fields comprises multiple flow ducts for a reaction medium, bounded by walls of webs. Each of the reactant flow fields is connected fluidically to its corresponding media port. This connection occurs through a distribution field in a distribution region situated outside an active region. The distribution field comprises at least one duct provided with a flow divider to divide up a flowing reaction medium before it is introduced into the active region. A plurality of such ducts of the distribution field having a flow divider is likewise possible.

Some embodiments provide a bipolar plate and a fuel cell stack which deal with the aforementioned drawback relating to unequal distribution of the reaction medium for the active region of the bipolar plate.

The bipolar plate described herein may be characterized in particular in that the duct comprising the flow divider has a duct elevation, comprising an ascent, which is present at a given distance upstream from the flow divider. In this way, the central media flow characterized by a laminar flow is forced to broaden out by the reduction in height of the duct, so that the cross sectional shape of the media flow changes from a round to an elliptical shape and therefore has a more gentle impact against the flow divider.

It is possible for the duct elevation to comprise a descent as the termination of the duct elevation, being situated at a second given distance upstream from the flow divider. In this way, a short and especially uniform raising of the duct bottom is created at a short distance in front of the flow divider. Merely as an example, the first distance of the ascent is from 1.5 cm to 3 cm before the flow divider, while the second distance of the descent may be 0.5 cm to 1.5 cm before the flow divider.

But it is also possible, alternatively, for the duct elevation to extend up to the flow divider and thus to have a descent provided on either side of the flow divider as the termination of the duct elevation. In this way, an especially uniform and shallow elevation is created with a beginning before the flow divider and two ends after the flow divider, resulting in an even more gentle impact of the media flow and thus making possible a more uniform distribution.

In order to protect the laminar flow with broadened cross section from experiencing turbulence, it is advantageous to have a constant flow cross section of the duct between the ascent and the at least one descent of the duct elevation.

In this regard, it is also advisable for the duct elevation to be formed uniform or constant over the entire width of the duct in the flow lengthwise direction.

Since in many cases it is enough to influence the center of the laminar media flow in order to change the cross sectional shape of the media flow from a round to an elliptical or oblong shape, it is advisable for the duct elevation to be convex in the flow lengthwise direction, especially when this convex duct elevation is formed in the center of the duct.

Furthermore, the possibility exists of having a nonuniform duct elevation which is optimized so that the volume flow is already influenced prior to the flow divider and the media flow is already prone to dividing. This configuration therefore goes beyond the mere dividing of the flow with the aid of the flow divider alone.

For a broadening of the round circular cross section of the laminar media flow, it has proven to be advantageous for the ascent of the duct elevation in the duct to result in an increase of 20 percent to 50 percent as compared to the duct depth (or duct height) of a section of the duct not having the elevation. Thus, in this way the flow cross section for the laminar flow is also reduced by 20 percent to 50 percent, for a corresponding redistribution of the largest flow velocity of the media flow.

An even more gentle deflection and redistribution of the media flow is possible when the flow divider is provided with a fillet.

The benefits, advantageous embodiments and effects explained in connection with the bipolar plate hold equally for the fuel cell stack, outfitted with a plurality of fuel cells having the bipolar plates as described herein. This also is distinguished by an improved distribution of the operating media due to the duct elevations used in the distribution region.

The features and combinations of features mentioned above in the description as well as the features and combinations of features mentioned below in the description of the figures and/or shows solely in the figures can be used not only in the particular indicated combination, but also in other combinations or standing alone. Thus, embodiments not shown or explained explicitly in the figures, yet deriving and producible from the explained embodiments by separated combinations of features shall also be deemed to be encompassed and disclosed by the present disclosure.

BRIEF DESCRIPTION OF THE SEVERAL VIEWS OF THE DRAWINGS

Further benefits, features and details will emerge from the claims, the following description of embodiments, and the drawings.

FIG. 1 is a schematic representation of a fuel cell stack comprising a plurality of fuel cells with the bipolar plates showing the main ducts.

FIG. 2 is a schematic representation of section II-II through the active region of the bipolar plate of FIG. 1.

FIG. 3 is a schematic detail view of a duct with flow divider in the distribution region of a bipolar plate of the prior art, corresponding to FIG. 1 (with flow distribution).

FIG. 4 is a schematic sectional view through a duct with an illustration of the flow velocity regions existing in the laminar media flow.

DETAILED DESCRIPTION

Figure 5:
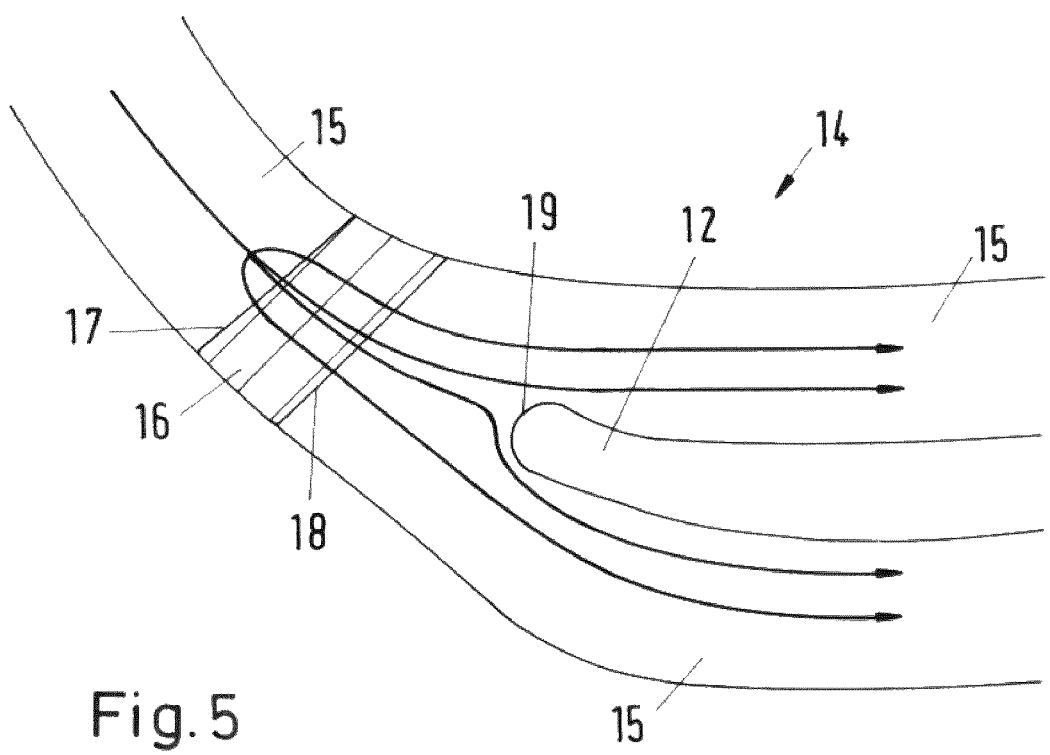
FIG. 5 is a representation of the distribution region corresponding to FIG. 3 with a duct elevation beginning upstream from the flow divider and ending upstream from the flow divider.

A fuel cell stack 1 shown in FIG. 1 consists of a plurality of fuel cells 2 switched in a row. Each of the fuel cells 2 comprises an anode and a cathode as well as a proton-conducting membrane separating the anode from the cathode. The two electrodes together with the membrane form a membrane electrode assembly 7 (MEA). The membrane is formed from an ionomer, such as a sulfonated tetrafluorethylene polymer (PTFE) or a polymer of perfluorinated sulfonic acid (PFSA). Alternatively, the membrane can be formed as a sulfonated hydrocarbon membrane.

Through anode spaces inside the fuel cell stack 1 fuel is supplied to the anodes (for example, hydrogen). In a polymer electrolyte membrane fuel cell (PEM fuel cell), fuel or fuel molecules are split into protons and electrons at the anode. The membrane lets through the protons (for example, $H^+$), but it is not permeable to the electrons ($e^-$). At the anode the following reaction occurs: $2H_2 \rightarrow 4H^+ + 4e^-$ (oxidation/electron surrender). While the protons pass through the membrane to the cathode, the electrons are taken by an external circuit to the cathode or to an energy accumulator. Through cathode spaces inside the fuel cell stack 1 the cathodes can be supplied with cathode gas (such as oxygen or air containing oxygen), so that the following reaction occurs at the cathode side: $O_2 + 4H^+ + 4e^- \rightarrow 2H_2O$ (reduction/electron uptake).

Air compressed by a compressor is supplied to the fuel cell stack 1 by a cathode fresh gas line. In addition, the fuel cell stack 1 is connected to a cathode exhaust gas line. At the anode side, hydrogen kept in a hydrogen tank is supplied to the fuel cell stack 1 by an anode fresh gas line in order to provide the reactants needed for the electrochemical reaction in a fuel cell 2. These gases are handed over to bipolar plates 3, which comprise main ducts 4 (ports) for the distribution of the gases to the membrane and the exit line. In addition, the bipolar plates comprise main coolant ducts 5 (ports) for the channeling of a cooling medium in a coolant duct 6, so that three different media are carried in the smallest of spaces.

Thus, FIG. 1 also shows the main ducts 4, 5, each time assembled in pairs, of a plurality of fuel cells 2 with bipolar plates 3, forming the fuel cell stack 1.

A detail cutout view of the fuel cell stack 1 along the sectioning line II-II of FIG. 1 is shown in FIG. 2. This sectioning line runs through the active region 13 of the fuel cell stack 1. The active region 13 of the bipolar plate 3 is naturally not itself electrochemically active, but it is situated next to those constituents of the fuel cell 2 in which the electrochemical fuel cell reaction occurs. It can be noticed that the bipolar plate 3 has reactant flow fields on its surfaces facing away from each other in this active region 13, being situated opposite each other and thus forming an opposite configuration. The reactant flow fields each comprise a plurality of flow ducts 9 for the particular reaction medium, bounded by walls 11 of webs 10. The webs 10 and the flow ducts 9 of one of the single plates 8 are thus configured to run opposite the webs 10 and the flow ducts 9 of the other of the single plates 8 in this active region 13. In this way, coolant ducts 6 are formed for a coolant flow field extending between the single plates 8.

It is necessary to introduce the operating media distributed as evenly as possible into the active region 13 of the bipolar plate, for which it is known how to introduce between the media ports 4, 5 and the active region 13 a distribution region with a distribution field comprising ducts 15. The ducts 15 have suitable branching points for this, which are realized by a flow divider 12, so that two of the ducts 15 continue downstream from the flow divider. This is illustrated in a detail view in FIGS. 3 and 4, where the operating medium arrives in the form of a laminar flow at the flow divider 12. FIG. 4 shows that the highest flow velocity of the flow occurs at the center of the cross section of the duct 15. This highest flow velocity therefore impacts against the flow divider 12.

Figure 9:
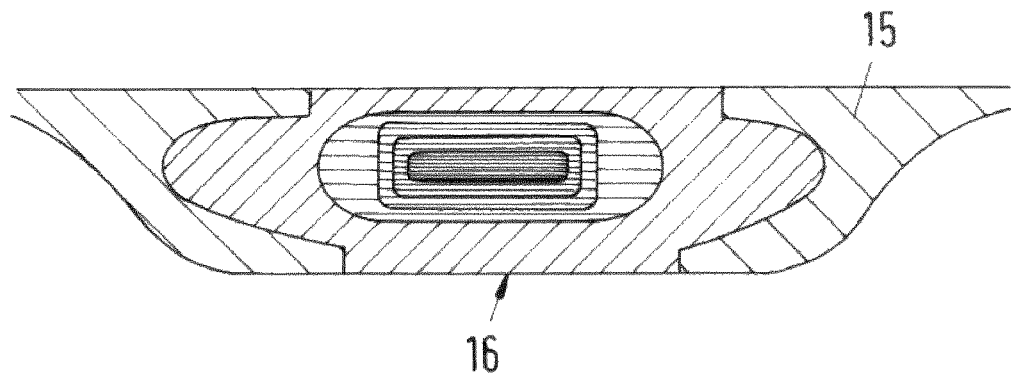
FIG. 9 illustrates the broadening of the flow velocity regions resulting from the duct elevation in a cross sectional view.

This problem is addressed by the bipolar plate 3, where the duct 15 comprising the flow divider 12 has a duct elevation 16, comprising an ascent 17, which is situated at a given distance upstream from the flow divider 12. Thanks to this duct elevation 16, the almost flow circular distribution of the flow velocity of the laminar flow in cross section is broadened out, as illustrated by the cross sectional view of FIG. 9. Thus, for example, it produces elliptical flow velocity regions. In this way, the flow impinges more "gently" on the flow divider 12, having the effect of a better distribution of the medium for the following regions of the distribution field or for the following active region 13 of the reactant flow field.

Figure 6:
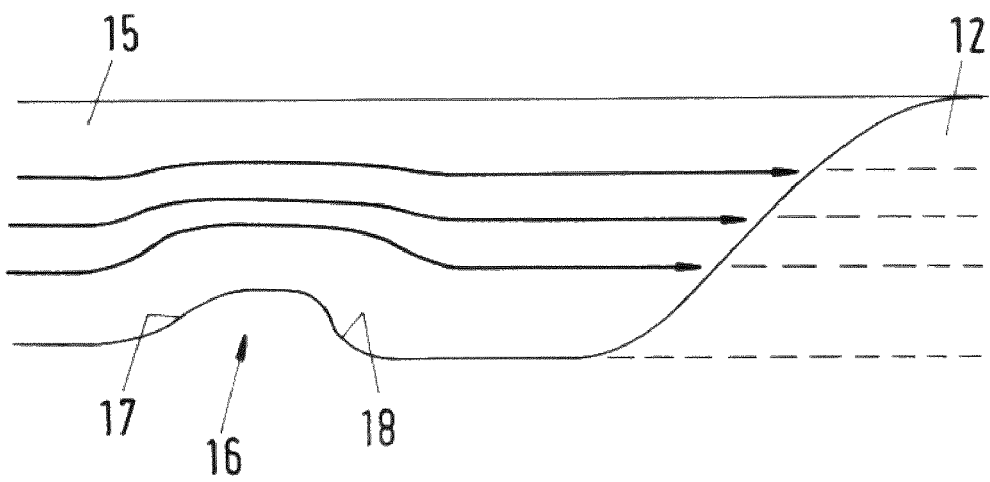
FIG. 6 is a side view of the duct from FIG. 5.

FIGS. 5 and 6 show a first configuration, where the duct elevation 16 comprises a descent 18 as the termination of the duct elevation 16, being situated at a second given distance upstream from the flow divider 12. Thus, the duct elevation 16 begins and ends just before the flow divider 12, which is enough to cause a broadening of the flow velocity distribution.

Figure 7:
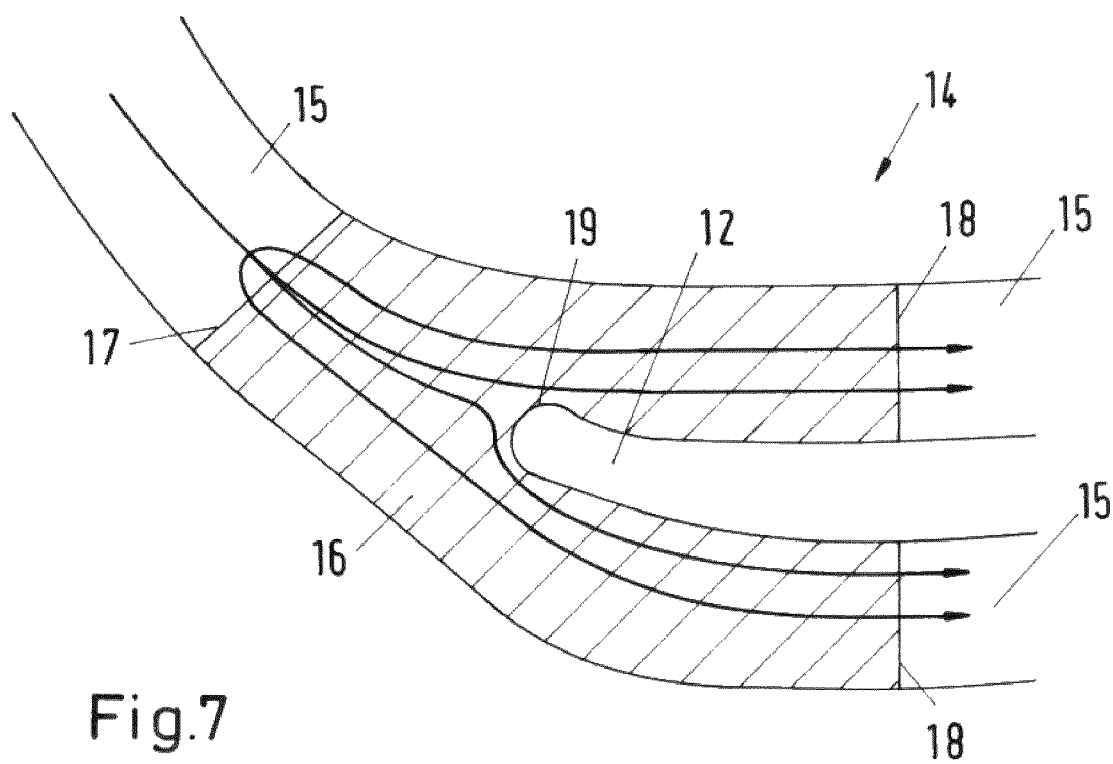
FIG. 7 is a representation of the distribution region corresponding to FIG. 3 with a duct elevation beginning upstream from the flow divider and ending downstream from the flow divider.
Figure 8:
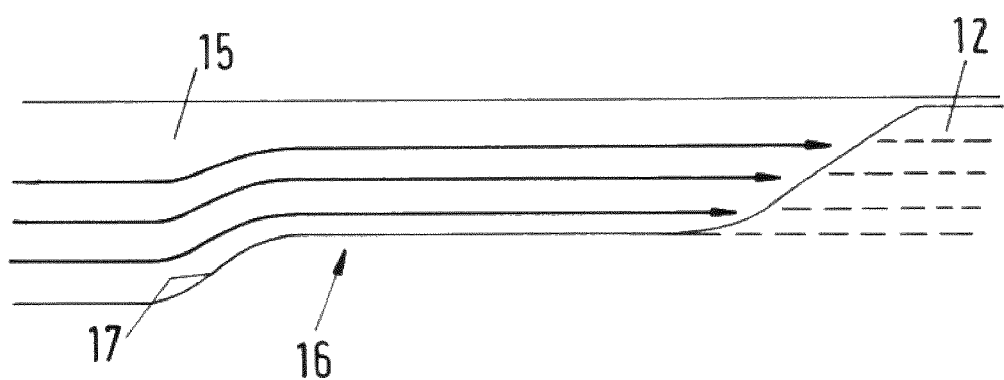
FIG. 8 is a side view of the duct from FIG. 7.

FIGS. 7 and 8 show a second configuration, where the duct elevation 16 extends up to and around the flow divider 12 and still continues for a bit after it. In this way, the duct elevation 16 has a descent 18 on either side of the flow divider 12 as the termination of the duct elevation 16.

In both configurations, there is a constant flow cross section of the duct 15 between the ascent 17 and the at least one descent 18 of the duct elevation 16, the duct elevation 12 being formed uniform or constant over the entire width of the duct 15 in the flow lengthwise direction. The ascent 17 of the duct elevation 16 in the duct 15 does not result in a total blockage of the media flow or to a true dividing of the flow, but rather the ascents 17 of the particular duct elevation 16 may result only in a raising by 20 percent to 50 percent as compared to the duct depth or duct height of a section of the duct 15 not having the elevation.

Figure 10:
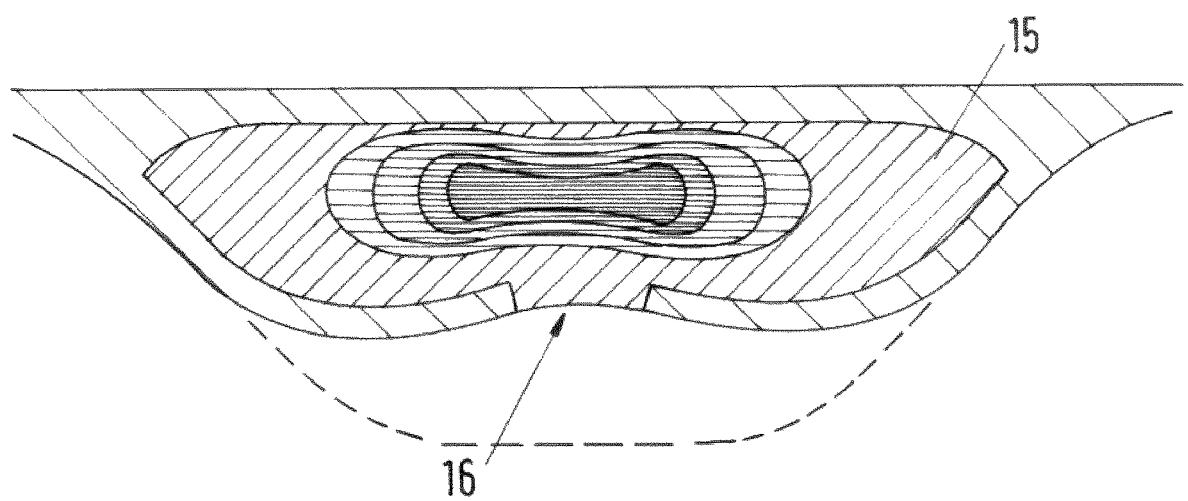
FIG. 10 illustrates the broadening of the flow velocity regions resulting from a convex shaped duct elevation in a cross sectional view.

FIG. 10, finally, shows the possibility of the duct elevation 16 being convex in the flow lengthwise direction. This convex duct elevation 16 is formed in the present instance in the middle of the duct, i.e., where the largest flow velocity of the media flow is present. Thanks to this central or middle convex duct elevation 16, the velocity distribution of the media flow is altered, in particular, broadened, so that the media flow impinges more "gently" against the flow divider 12. It should be pointed out that other configurations are possible for the duct elevations 16, resulting in a desired redistributing of the regions for the flow velocities.

Each of the flow dividers 12 shown have been provided with a fillet 19, which further favors the dividing up or redistributing of the media flow.

As a result, an equal distribution of the media flows already in the distribution region 14 is possible, so that there is an improved media distribution over the entire bipolar plate 3 and at the same time over the entire fuel cell stack 1.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A bipolar plate formed with a reactant flow field on each of its plate surfaces facing away from each other, comprising:
multiple flow ducts for a reaction medium, bounded by walls of webs, wherein the respective reactant flow field is connected fluidically to a media port across a distribution region situated outside an active region, wherein at least one duct of the distribution field is provided with a flow divider to divide up a flowing reaction medium before it is introduced into the active region, wherein the duct comprising the flow divider has a duct elevation, comprising an ascent, which is present at a given distance upstream from the flow divider.

2. The bipolar plate according to claim 1, wherein the duct elevation comprises a descent as the termination of the duct elevation, being situated at a second given distance upstream from the flow divider.

3. The bipolar plate according to claim 2, wherein there is a constant flow cross section of the duct between the ascent and the at least one descent of the duct elevation.

4. The bipolar plate according to claim 1, wherein the duct elevation extends up to the flow divider and thus has a descent provided on either side of the flow divider as the termination of the duct elevation.

5. The bipolar plate according to claim 1, wherein the duct elevation is formed uniform or constant over the entire width of the duct in the flow lengthwise direction.

6. The bipolar plate according to claim 1, wherein the duct elevation is convex in the flow lengthwise direction.

7. The bipolar plate according to claim 6, wherein the convex duct elevation is formed in the center of the duct.

8. The bipolar plate according to claim 1, wherein the ascent of the duct elevation in the duct results in an increase of 20 percent to 50 percent as compared to the duct depth of a section of the duct not having the elevation.

9. The bipolar plate according to claim 1, wherein the flow divider is provided with a fillet.

10. A fuel cell stack comprising a plurality of fuel cells having bipolar plates according to claim 1.

* * * * *